UNITED STATES PATENT OFFICE.

MORIZ WEINRICH, OF ST. LOUIS, MISSOURI.

PROCESS OF REVIVIFYING BONE-BLACK.

SPECIFICATION forming part of Letters Patent No. 509,460, dated November 28, 1893.

Application filed February 20, 1893. Serial No. 463,124. (No specimens.)

*To all whom it may concern:*

Be it known that I, MORIZ WEINRICH, of St. Louis, in the State of Missouri, have invented certain new and useful Improvements in the Revivification of Bone-Charcoal; and I do hereby declare that the following is a full, clear, and exact description of the invention, which will enable others skilled in the art to which it appertains to make and use the same.

It is well known that bone charcoal, also known as bone-char, contains about ninety per cent. of a mineral body or frame-work composed chiefly of phosphate of lime and carbonate of lime. This frame-work which is exceedingly porous, is covered with a thin layer of azotic carbonaceous material, originating from the organic gelatinous matter which remains in the bones after their fat has been extracted. In the use of bonechar for filtering purposes this animal carbon is the only agent in the bonechar, which absorbs color and also many mineral and organic bodies from the sugar-solutions or other solutions treated; the mineral frame-work above named acting only as a support of or for the carbon. It is further well known that by the repeated use of bonechar in spite of the most careful washing, treating with different chemicals, and reburning in kilns, its carbon becomes by and by ineffective, since the foreign bodies which it has absorbed cannot be all removed by such method of restoration, or revivification, and they gradually cover and choke the very fine pores of the carbon. The use of such spent bonechar has therefore to be discontinued, and it is generally sold for fertilizing purposes at about one third of the price of new bonechar. I have made the discovery that such spent bonechar can be completely regenerated in a very simple and cheap way.

To attain this object I proceed as follows: The spent and heretofore discarded bonechar is put into a vessel supplied with a false bottom, and a steam-coil and washed therein carefully with pure hot water; and it may be treated besides with one or more of the well known purifying agents, as for instance, muriatic acid, soda or ammonia, or the old carbon may be entirely removed in the well known way by heating the bone-black under admission of air until the carbon is burned and only the mineral framework left.

The washing water is drawn off through the false bottom, and a hot solution of crude bone gelatine or of dissolved glue, showing about 12° Baumé at 150° Fahrenheit, is now allowed to run into the vessel on top of the bonechar. About one hundred and seventy-five pounds of such a solution will be the proper quantity for one thousand pounds of bonechar. It will penetrate the damp mass of the bonechar and just cover it a little. Steam is now applied, the temperature brought to boiling point, and the mass kept boiling for about half an hour. After this time the water-contents of the mass are reduced to such a degree, that the gelatine will all stick on the surface and in the pores of the bonechar. The mass is now taken out, and spread and dried upon a heated surface. During the drying process it has to be stirred from time to time, in order to avoid its baking together. As soon as this bonechar thus coated with gelatine, is entirely dry, it is charred in bonechar kilns in the well known way, until all the gelatine is carbonized thus covering the old ineffective layer with a new coat. The burned and cooled bonechar is now washed with pure hot water, and is then ready for use. It will now be found to be again quite as efficacious as new bonechar.

This process can be repeated as often as the decolorizing power of the char for the filtering of solutions, is reduced to a certain degree; none of the spent char has, as heretofore, to be turned out of the factory because of being useless or unavailable for filtering, and great savings can be thereby attained. Similar results can be obtained by using a mixture of gelatine or dissolved glue and fresh blood; or by fresh blood only. In this last named case the fresh blood should be mixed preliminarily with carbonate of potash (one hundred and twenty-five pounds to one thousand pounds of blood); or carbonate of soda (two hundred and eighty pounds to one thousand pounds of blood); and the temperature, while impregnating the bonechar with the solution, must not exceed 150° Fahrenheit, in order to avoid the coagulation of the albumen contained in the blood. When the charring of the bonechar is finished, the potash or soda has to be extracted again by hot water and may be used in subsequent operations. I generally prefer to use gelatine or dissolved glue alone; its application being simpler and surer.

In using blood, great care has to be taken during the burning process, because if too much heat be applied at the beginning of the operation, some of the organic bodies of the blood will fuse, choke the pores, and give the char a glossy appearance. The gases escaping from the bonechar while being burned in the kilns, may be used in the same way as is now practiced in bonechar factories.

This process can be applied also with good advantage to other filtering materials containing no animal carbon, as for instance, wood-charcoal, corn-cobs (crude or charred), coke, sand, &c.

The method or process of treating such materials is exactly the same as described above, and by giving them a coat of animal carbon, they will obtain a more or less decolorizing power, thus considerably increasing their value and range of use.

I claim—

1. The described process of regenerating and re-carbonizing spent bone-char, consisting in supplying it with a new charge or coating of animal carbon, by impregnating it with a solution of organic animal matter such as gelatine as set forth and then drying and charring said product, all substantially as set forth.

2. The described process of regenerating and re-carbonizing spent bone-char, consisting in supplying it with a new charge or coat of animal carbon, by impregnating it with a hot solution of crude gelatine, and then drying and charring it, all substantially as set forth.

MORIZ WEINRICH.

Witnesses:
BERTHOLD S. LANGE,
HENRY LURKINS.